(12) United States Patent
Gotmare et al.

(10) Patent No.: US 12,450,428 B2
(45) Date of Patent: Oct. 21, 2025

(54) SYSTEMS AND METHODS FOR SEMANTIC CODE SEARCH

(71) Applicant: Salesforce.com, Inc., San Francisco, CA (US)

(72) Inventors: Akhilesh Deepak Gotmare, Singapore (SG); Junnan Li, Singapore (SG); Shafiq Rayhan Joty, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 803 days.

(21) Appl. No.: 17/531,591

(22) Filed: Nov. 19, 2021

(65) Prior Publication Data

US 2022/0374595 A1 Nov. 24, 2022

Related U.S. Application Data

(60) Provisional application No. 63/189,854, filed on May 18, 2021.

(51) Int. Cl.
*G06F 40/226* (2020.01)
*G06F 40/151* (2020.01)
*G06F 40/30* (2020.01)
*G06F 40/40* (2020.01)

(52) U.S. Cl.
CPC .......... *G06F 40/226* (2020.01); *G06F 40/151* (2020.01); *G06F 40/30* (2020.01); *G06F 40/40* (2020.01)

(58) Field of Classification Search
CPC ........ G06F 40/226; G06F 40/40; G06F 40/30; G06F 40/151
See application file for complete search history.

(56) References Cited

U.S. PATENT DOCUMENTS

2021/0248446 A1* 8/2021 Hughes .................. G06N 3/045
2021/0287069 A1* 9/2021 Mumcuyan ........... G06F 18/214
2022/0358295 A1* 11/2022 Nair ......................... G06N 5/04

OTHER PUBLICATIONS

Heyman, Geert, and Tom Van Cutsem. "Neural code search revisited: Enhancing code snippet retrieval through natural language intent." arXiv preprint arXiv:2008.12193 (2020). (Year: 2020).*
Le-Khac, Phuc H., Graham Healy, and Alan F. Smeaton. "Contrastive representation learning: A framework and review." Ieee Access 8 (2020): 193907-193934. (Year: 2020).*
Alon, Uri, et al. "code2vec: Learning distributed representations of code." Proceedings of the ACM on Programming Languages 3. POPL (2019): 1-29. (Year: 2019).*

* cited by examiner

*Primary Examiner* — Bhavesh M Mehta
*Assistant Examiner* — Edward Tracy, Jr.
(74) *Attorney, Agent, or Firm* — Haynes and Boone, LLP (57) ABSTRACT

Embodiments described herein provides a contrastive learning framework that leverages hard negative examples, that are mined globally from the entire training corpus for a given query to improve the quality of code and natural language representations. Specifically, similar examples from the training corpus are extracted and used as hard negatives in an online manner during training while keeping the minibatch construction random.

20 Claims, 9 Drawing Sheets

```
┌─────────────────────────────────────────────────────────────┐
│  Receive a training corpus of bimodal pairs, wherein a       │
│  training pair includes a natural language description and   │
│  a programming language code 502                             │
└─────────────────────────────────────────────────────────────┘
                            ↓
┌─────────────────────────────────────────────────────────────┐
│  Encode, by an encoder, the natural language description     │
│  into a natural language representation and the programming  │
│  language snippet into a programing language                 │
│  representation 504                                          │
└─────────────────────────────────────────────────────────────┘
                            ↓
┌─────────────────────────────────────────────────────────────┐
│  Determine a set of nearest neighbor representations to a    │
│  positive pair of the natural language representation and    │
│  the programming language representation in a feature space  │
│  of the training corpus  506                                 │
└─────────────────────────────────────────────────────────────┘
                            ↓
┌─────────────────────────────────────────────────────────────┐
│  Form a set of negative pairs using at least one of the      │
│  natural language representation and the programming         │
│  language representation, and the set of nearest neighbor    │
│  representations  508                                        │
└─────────────────────────────────────────────────────────────┘
                            ↓
┌─────────────────────────────────────────────────────────────┐
│  Compute a contrastive learning loss corresponding to the    │
│  formed set of negative pairs based on a positive pair of    │
│  the natural language representation and the programming     │
│  language representation and the set of negative pairs 510   │
└─────────────────────────────────────────────────────────────┘
                            ↓
┌─────────────────────────────────────────────────────────────┐
│  (Alternatively) Determine a specific set of negative pairs  │
│  that maximizes the contrastive learning loss during a       │
│  first training epoch 512                                    │
└─────────────────────────────────────────────────────────────┘
                            ↓
┌─────────────────────────────────────────────────────────────┐
│  (Alternatively) Update parameters of the encoder by         │
│  minimizing the contrastive learning loss computed from the  │
│  specific set of negative pairs during a second training     │
│  epoch 514                                                   │
└─────────────────────────────────────────────────────────────┘
```

| Method label | Description (how negatives are picked for $\{x_i, y_i\}$) | MRR (Ruby Dev set) | MRR (Ruby Test set) |
|---|---|---|---|
| random 602 | Pick random instances from the training corpus $C$ | 0.7751 | 0.7244 |
| text-code 604 | Find NN of $f_\theta(x_i)$ directly in the PL index $\{f_\theta(y_j)\}_{j=1}^{|C|}$. Index updated every epoch | 0.7886 | 0.7404 |
| text-text 606 | Find NN of $f_\theta(x_i)$ in the NL index $\{f_\theta(x_j)\}_{j=1}^{|C|}$, use corresponding PL part of the neighbors $(y_j)$ as the global hard negatives. Index updated every epoch. | 0.7803 | 0.7346 |
| text-text; no index updates 608 | Same as text-text. No index updates. | 0.7781 | 0.7383 |
| code-code 610 | Find NN of $f_\theta(y_i)$ in the PL index $\{f_\theta(y_j)\}_{j=1}^{|C|}$. Index updated every epoch. | 0.7828 | 0.7411 |
| code-text 612 | Find NN of $f_\theta(y_i)$ in the NL index $\{f_\theta(x_j)\}_{j=1}^{|C|}$. Index updated every epoch. | 0.7738 | 0.724 |

| Mining variant | NL hard negative examples | PL hard negative examples |
| --- | --- | --- |
| Random | Create an instance object | ```
def get_group_instance(self, parent):
    o = copy.copy(self)
    o.init_instance(parent)
    return o
``` |
| text-code: Find NN of $f_\theta(x_i)$ directly in the PL index $\{f_\theta(y_i)\}_{i=1}^N$, use returned $y_j$ as hard -ve | Move the temporary log file to the MultiQC data directory if it exists. | ```
def move_tmp_log(logger):
    try:
        logging.shutdown()
        shutil.move(log_tmp_fn, os.path.join(config.data_dir,
            'multiqc.log'))
        util_functions.robust_rmtree(log_tmp_dir)
    except (AttributeError, TypeError, IOError):
        pass
``` |
| text-text: Find NN of $f_\theta(x_i)$ in the NL index $\{f_\theta(x_i)\}_{i=1}^N$, use corresponding PL part $y_j$ of the NN $x_j$ as hard -ve | Create a dir for the given dirfile and display an error message if it fails. | ```
def create_dir(self, jbfile):
    try:
        jbfile.create_directory()
    except os.error:
        self.statusbar.showMessage("""Could not create
            path: %s""" % jbfile.get_path())
``` |
| code-code: Find NN of $f_\theta(y_i)$ in the PL index $\{f_\theta(y_i)\}_{i=1}^N$, use returned $y_j$ as hard -ve | Return the ConfigObj for the specified file | ```
def load_config(f, spec):
    dirname = os.path.dirname(f)
    if not os.path.exists(dirname):
        os.makedirs(dirname)
    c = ConfigObj(infile=f, configspec=spec,
        interpolation=False, create_empty=True)
    try:
        clean_config(c)
    except ConfigError, e:
        msg = """Config %s could not be loaded. Reason: %s""" \
            % (c.filename, e ) log.debug(msg)
        raise ConfigError(msg)
    return c
``` |

*FIG. 8*

| Model/Method | Ruby | Javascript | Go | Python | Java | Php | Overall |
|---|---|---|---|---|---|---|---|
| NBow | 0.162 | 0.157 | 0.330 | 0.161 | 0.171 | 0.152 | 0.189 |
| CNN | 0.276 | 0.224 | 0.680 | 0.242 | 0.263 | 0.260 | 0.324 |
| BiRNN | 0.213 | 0.193 | 0.688 | 0.290 | 0.304 | 0.338 | 0.338 |
| selfAtt | 0.275 | 0.287 | 0.723 | 0.398 | 0.404 | 0.426 | 0.419 |
| RoBERTa | 0.587 | 0.517 | 0.850 | 0.587 | 0.599 | 0.560 | 0.617 |
| RoBERTa (code) | 0.628 | 0.562 | 0.859 | 0.610 | 0.620 | 0.579 | 0.643 |
| CodeBERT | 0.679 | 0.620 | 0.882 | 0.672 | 0.676 | 0.618 | 0.693 |
| GraphCodeBERT | 0.703 | 0.644 | 0.897 | 0.692 | 0.691 | 0.649 | 0.713 |
| DyHardCode (CodeBERT) | 0.715 | 0.666 | 0.917 | 0.713 | 0.729 | 0.636 | 0.729 |
| DyHardCode (GraphCodeBERT) | 0.740 | 0.687 | 0.921 | 0.738 | 0.738 | 0.677 | 0.750 |

*FIG. 9*

| Model/Method | Test MRR | Train Batchsize |
|---|---|---|
| RoBERTa | 0.1833 | - |
| CodeBERT | 0.2719 | 32 |
| CodeBERT | 0.3314 | 128 |
| CodeBERT | 0.3419 | 384 |
| CodeBERT | 0.3433 | 512 |
| DyHardCode | 0.3784 | 64 |

*FIG. 10*

| Model/Method | Test MAP | Train Batchsize |
|---|---|---|
| RoBERTa | 0.7677 | - |
| CodeBERT | 0.8267 | 32 |
| CodeBERT | 0.8882 | 160 |
| DyHardCode | 0.8910 | 160 |

*FIG. 11*

SYSTEMS AND METHODS FOR SEMANTIC CODE SEARCH

CROSS REFERENCES

The instant application is a nonprovisional of and claims priority under 35 U.S.C. § 119 to co-pending and commonly-owned U.S. provisional application No. 63/189,854, filed May 18, 2021, which is hereby expressly incorporated by reference herein in its entirety.

TECHNICAL FIELD

The embodiments relate generally to machine learning systems and computer vision, and more specifically to a contrastive learning mechanism of natural language and code representation for sematic code search.

BACKGROUND

Machine learning systems have been widely used in natural language processing (NLP) tasks, e.g., in question and answering, text classification, and/or the like. Retrieving semantically relevant code functions given a natural language (NL) or programming language (PL) query is a task of great practical value towards building productivity enhancing tools for software developers. Existing approaches to solve this task usually involve leveraging transformer based masked language models that are pre-trained on NL and PL and fine-tuned for code search. For example, contrastive learning may be used based on pairs of NL and PL samples. Positive pairs of NL and PL samples (e.g., NL description that matches with or corresponds to the PL snippet) are pulled closer in a cluster while negative pairs of NL and PL samples (e.g., NL description that does not match with or correspond to the PL snippet) may be pushed away in the feature space. Traditionally, the negative pairs for training may be randomly generated from the training corpus. These existing approaches, however, often, under-utilize the bimodal setup of natural language and programming code.

BRIEF DESCRIPTION OF THE DRAWINGS

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

In natural language code search, the relevant code snippet is to be returned from a given corpus $\mathcal{C} = \{y_{c_1}, \ldots, y_{c_{|\mathcal{C}|}}\}$ for a natural language query $x_q$. Semantic code search models may select the PL snippets in response to an NL query based on the similarity score between the query embedding $x_q$ and the candidate embeddings $y_c$ (from the corpus $\mathcal{C}$), a ranking for the candidates can be obtained. The average mean reciprocal ranking (MRR) is then computed over queries from the held-out test set to evaluate the resulting code search model. The training dataset to learn such a model for the natural language code search task consists of bimodal pairs $\{x_i, y_i\}$, where $x_i$ denotes the NL description of the i-th data point and $y_i$ denotes the corresponding programming language (PL) code (function or class). Given such a bimodal dataset of source code and their corresponding natural language descriptions (i.e., docstrings), when contrastive learning is used to train the sematic code search module 130, the contrastive learning framework is configured to learn the representations such that a vector representing a piece of code is close to the vector representing the docstring description of the code.

In another embodiment, the semantic code search model may contain a unified encoder that can take as its input the concatenation of the NL query $x_q$ and a candidate code snippet $y_c$, and return the probability of $y_{c_i}$ being the correct response for the query (can be formulated as binary classification). Intuitively, such a model could benefit from the interactions between the NL and PL tokens in the self-attention layers of the Transformer encoder. However, it would need |C| (size of the candidate code corpus) forward passes for each new query during inference, making it hard to scale to real world setups where is large.

In one embodiment, the negative samples may be selected by a retrieval model as the top K candidates based on the similarity of the NL query $x_i$ and candidate embeddings (computed independently), followed by a unified encoder that ranks these top K candidates. The top K candidates may then be paired with the NL query as negative pairs for contrastive learning.

In view of the existing issues in contrastive learning of semantic code search models, embodiments described herein provides a contrastive learning framework that leverages hard negative examples, that are mined globally from the entire training corpus for a given query to improve the quality of code and natural language representations. Specifically, the K nearest neighbors can be determined by random selection, K-nearest neighbors of PL part, nearest neighbors of the NL part and/or a combination of the nearest neighbors of the NL and PL parts. These negative examples are extracted from the training corpus and used as hard negatives in an online manner during training while keeping the minibatch construction random.

Although the contrastive learning framework with hard negatives described herein has been described with a semantic code search system, the methods and systems for contrastive learning with hard negatives may be applied to other types of systems. For example, in computer vision, the method described herein to select hard negatives may be used to generate negative image samples for contrastive learning.

Overview

Figure 1:
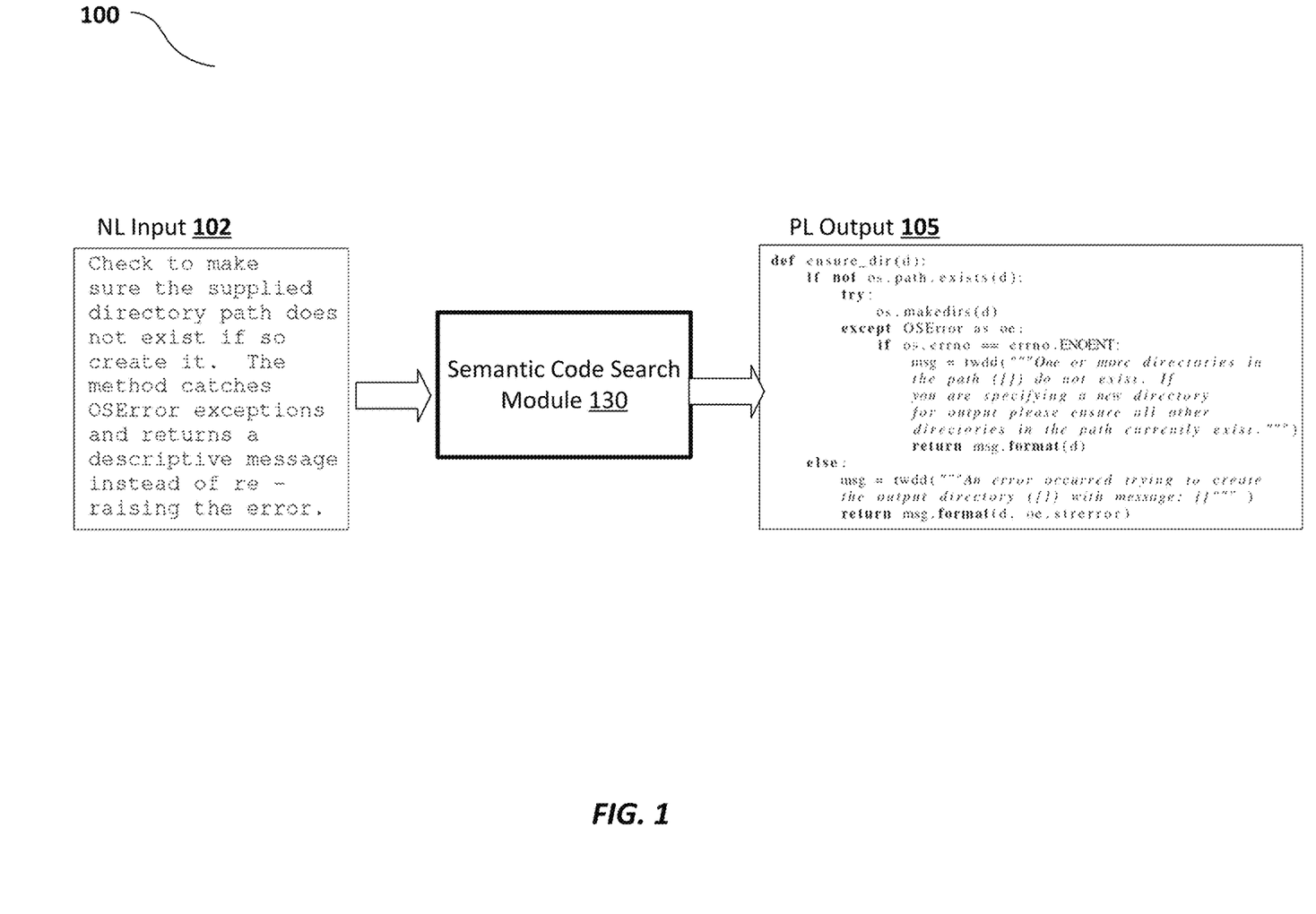
FIG. 1 is a simplified diagram illustrating a sematic code search based on a NL query, according to an embodiment described herein.

FIG. 1 is a simplified diagram 100 illustrating a sematic code search based on a NL query, according to an embodiment described herein. A semantic code search module 130 may receive a natural language query input 102, e.g., which may describe a certain function to be performed, requesting the return of a related PL snippet output 105. In natural language code search, the relevant code snippet 105 is to be returned from a given corpus $\mathcal{C} = \{y_{c_1}, \ldots, y_{c_{|C|}}\}$ for a natural language query $x_q$. For example, the PL snippet 105 is an example code snippet that matches with the NL input query 102.

Figure 2:
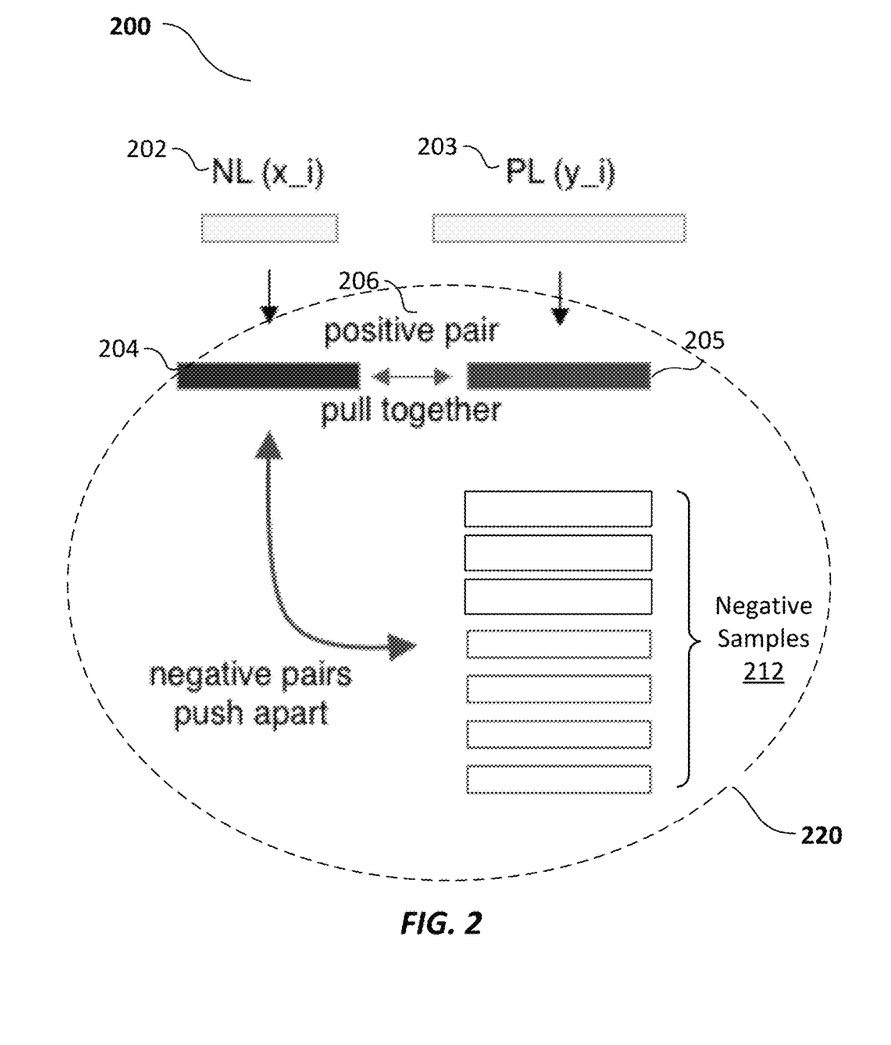
FIG. 2 is a simplified diagram illustrating a contrastive learning framework for training the sematic code search module shown in FIG. 1, according to one embodiment described herein.

FIG. 2 is a simplified diagram 200 illustrating a contrastive learning framework for training the sematic code search module 130 shown in FIG. 1, according to one embodiment described herein. An NL input part 202 and a PL input part 203 may be encoded by an encoder into a NL representation 204, and a PL representation 205, which forms a positive pair 206 for contrastive learning. Negative pairs may be formed with the NL representation 204 and other negative samples 212 (e.g., other PL snippets) obtained from a training dataset. Thus, the contrastive learning may pull together the NL representative 204 and the PL representation 205 that belongs to the positive pair 206, while pushing apart the negative samples 212 from the NL representation 204, in the feature space 220.

For example, if θ denotes the model parameters of the semantic code search module 130 and $f_\theta(x) \in \mathbb{R}^d$ be the model's representation (e.g., 204 and 205) for input x (variable length sequence), for a model to be a good retriever, $f_\theta(x_i)$ is desired to be close to $f_\theta(y_i) \in \mathbb{R}^d$ than to $f_\theta(y_j) \forall j \neq i$, as per some similarity metric (e.g., cosine distance or $L_2$ distance). Here $\{x_i, y_i\}$ is a pair of the NL docstring 202 $x_i$ describing the code (PL part 203) $y_i$. The parameters θ may be initialized using existing systems in code pre-training and make use of the transformer encoder based CodeBERT model (see Guo et al., Graphcode-BERT: Pre-training code representations with data flow, in proceedings of International Conference on Learning Representation, 2021) that is pre-trained on PL and NL using a hybrid objective of replaced token detection and masked language modeling. The GraphCodeBERT model described in Guo et al., may be used to leverage the inherent structure of code by considering the data flow of the source code in its pre-training stage.

Thus, in the contrastive learning framework shown at diagram 200, the training of θ may be formulated by minimizing the contrastive loss:

$$\min_\theta \sum_{i=1}^N -\log \frac{\exp(f_\theta(x_i)^T f_\theta(y_i)/\sigma)}{\sum_{j \in B} \exp(f_\theta(x_i)^T f_\theta(y_j)/\sigma)} \quad (1)$$

where N is the number of training NL-PL pairs, σ is a temperature hyper-parameter (this can be made learnable too), and B denotes the current training mini-batch. Thus, with this contrastive learning framework, $\{x_i, y_i\}$ is a positive pair—representations of which are pulled closer, while $\{x_i, y_j\}$ for all $j \in B$ and $j \neq i$ are negative pairs—representations of which are pushed apart.

Clearly, the number of negative samples 212 considered and their quality can affect the model performance. A larger number of negatives increases the tightness of the lower bound of mutual information computed for the contrastive loss, hence learning with more negatives can better maximize the mutual information. Existing work on self-supervised contrastive learning also empirically shows that using more negatives improves representation learning performance. Consistent with these findings, when training with the objective in Eq. (1), the number of negatives per positive pair impacts the quality of PL and NL representations learned for code search, with larger number of negatives leading to better performance. Since the negatives in the above setup are determined by the training batch-size |B| (in-batch negatives), the performance of the model improves with larger batch sizes. For example, an MRR of 0.7546, 0.7554, 0.7582, 0.7682 may achieve desirable performance for batch-sizes of 32, 64, 128, 512 respectively on the Ruby NLCode search dev set with GraphCodeBERT baseline tuned for 10 epochs as per the objective in Equation (1).

Existing systems generally select the negative samples 212 with random sampling during the mini-batch construction. The negatives 212 chosen in the code search fine-tuning setup, that would be paired with $x_i$, will be random and a majority of them will be unrelated to the pair $\{x_i, y_i\}$ under consideration. Such random in-batch negatives may lead to diminishing gradient norms, large gradient variances, and slow convergence when training retrieval models. With random mini-batches, majority of the negative samples are likely to be uninformative for the learning of useful representations for retrieval.

One possible approach to overcome these issues is to construct mini-batches such that the examples within a minibatch are similar. However, this may lead to a harder classification task and a stronger training signal for the retrieval model, with the negatives being "hard" enough. Such construction of batches can be achieved by performing clustering on the training corpus, with the requirement that the sizes of the resulting clusters be the same. However, the clustering stage of this method would be costly and thus inefficient. For example, these cluster assignments often need to be updated as the model gets updated over the training iterations in order to benefit from newer model representations. This would require the clustering operation to be performed frequently using representations from the latest model checkpoint θ (e.g., once every 500 training iterations or once every training epoch), making this method impractical.

Figure 3:
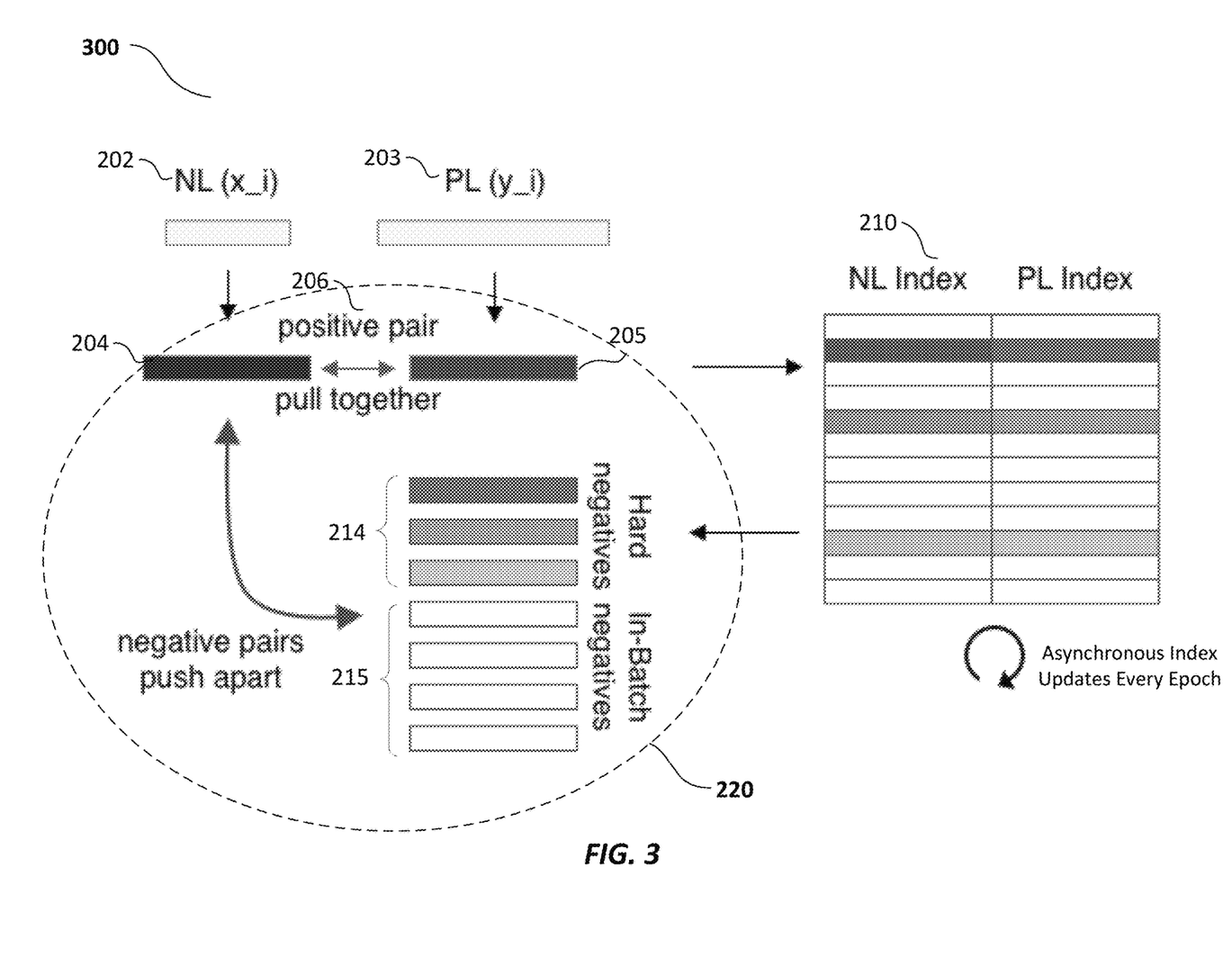
FIG. 3 is a block diagram illustrating a contrastive learning framework based on hard negative samples, according to one embodiment described herein.

FIG. 3 is a block diagram 300 illustrating a contrastive learning framework based on hard negative samples, according to one embodiment described herein. In view of the limitation of uninformative negatives, the contrastive learning framework shown at diagram 300 extracts similar examples from the training corpus, e.g., the top K "nearest" samples in the feature space 220 are used as hard negatives 214 in an online manner during training. The rest of the in-batch negatives 215 may still be constructed randomly.

For example, a FAISS index 210 (described in Johnson et al., Billion-scale similarity search with gpus, arXiv preprint arXiv:1702.08734, 2017) consisting of the representations of all the training set pairs: $\{f_\theta(x_i)\}_{i=1}^N$ and $\{f_\theta(y_i)\}_{i=1}^N$ is computed. As used herein, the term "index" or "representation" may be used both referring to the encoded representations of the input sequence.

For each positive pair $\{x_i, y_i\}$, only the corresponding hard negatives 214 are used to compute the contrastive loss. Or alternatively, for each positive pair, the hard negatives 214 and the negatives 215 (in batch or random negatives) are both used in computing the contrastive loss. The resulting contrastive learning objective $\mathcal{L}(\theta)$ being minimized is then computed as:

$$\sum_{i=1}^N -\log \frac{\exp(f_\theta(x_i)^T f_\theta(y_i)/\sigma)}{\sum_{j \in B \cup H(i,K)} \exp(f_\theta(x_i)^T f_\theta(y_j)/\sigma)} \quad (2)$$

Where H(i, K) represents the set of the top-K hardest negatives for the i-th training instance $\{x_i, y_i\}$ globally (i.e., from the entire training corpus).

In one embodiment, in the text retrieval setup (e.g., single modality of NL query searching for a NL answer only), the nearest neighbors can be selected directly from a single FAISS index and use them be used as hard negatives. However, in the NL code search task, a number of different ways to select the "K-nearest neighbors" in the features space may be implemented, as further described in FIGS. 5-6. These variants differ in the query embedding $f_\theta(x_i)$ or $f_\theta(y_i)$, and in the choice of the index being probed: NL index $\{f_\theta(x_j)\}_{j=1}^{|C|}$ or the PL index $\{f_\theta(y_j)\}_{j=1}^{|C|}$.

In one embodiment, the negative examples 214 returned for an input instance are dynamic as the query embedding $f_\theta(x_i)$ or $f_\theta(y_i)$ will change with the model parameters $\theta$ being updated over the training iterations. Therefore, the FAISS index 210 of the NL and PL embeddings may be periodically updated, e.g., every training epoch.

For example, the FAISS index (NL part: $\{f_{\theta_0}(x_i)\}_{i=1}^N$ and PL part $\{f_{\theta_0}(y_i)\}_{i=1}^N$) is constructed at the beginning of the training with the initial model parameters $\theta_0$. As training progresses and the model parameters are updated, the representations stored in the index would get stale. This could lead to poorer quality of neighbors returned for a query and worsen the quality of negatives. To mitigate this, the FAISS index is updated with the latest model parameters after every epoch. The construction/updating of the index requires a forward pass over the entire training dataset, this requires a small fraction of the time required in the regular training epochs, and lesser computational resources.

Computer Environment

Figure 4:
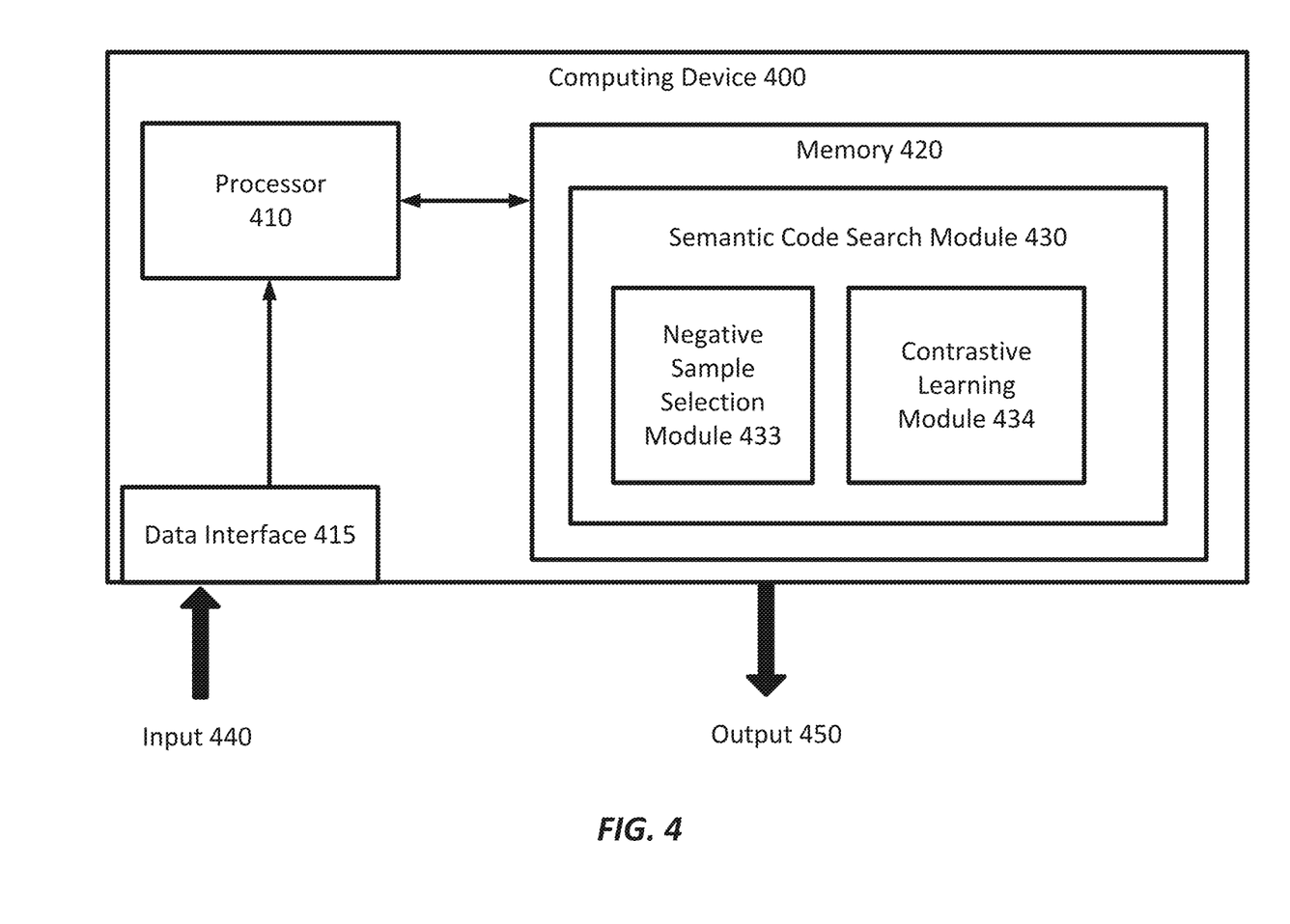
FIG. 4 is a simplified diagram of a computing device that implements the contrastive learning framework for semantic code search, according to some embodiments described herein.

FIG. 4 is a simplified diagram of a computing device that implements the contrastive learning framework for semantic code search, according to some embodiments described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a semantic code search module 430 that may be used to implement and/or emulate the systems and models, and/or to implement any of the methods described further herein. In some examples, the semantic code search module 430, may receive an input 440, e.g., such as a PL snippet or a NL description, via a data interface 415. The data interface 415 may be any of a user interface that receives a user uploaded NL-PL snippet, or a communication interface that may receive or retrieve a previously stored NL-PL snippet from the database. The semantic code search module 430 may generate an output 450, such as a PL snippet in response to a NL query input 440.

The semantic code search module 430 has one or more submodules including the negative sample selection module 433 and the contrastive learning module 434. For example, the negative sample selection module 433 is configured to select the hard negatives 214 and the contrastive learning module 434 is configured to use the hard negatives 214 together with a positive pair for contrastive learning. The semantic code search module 430 and/or its submodules 433-434 may be implemented using hardware, software, and/or a combination of hardware and software. Further details of training the semantic code search module 430 using contrastive learning with hard negative samples can be found in FIGS. 5-6.

Contrastive Learning Workflows

Figure 5:
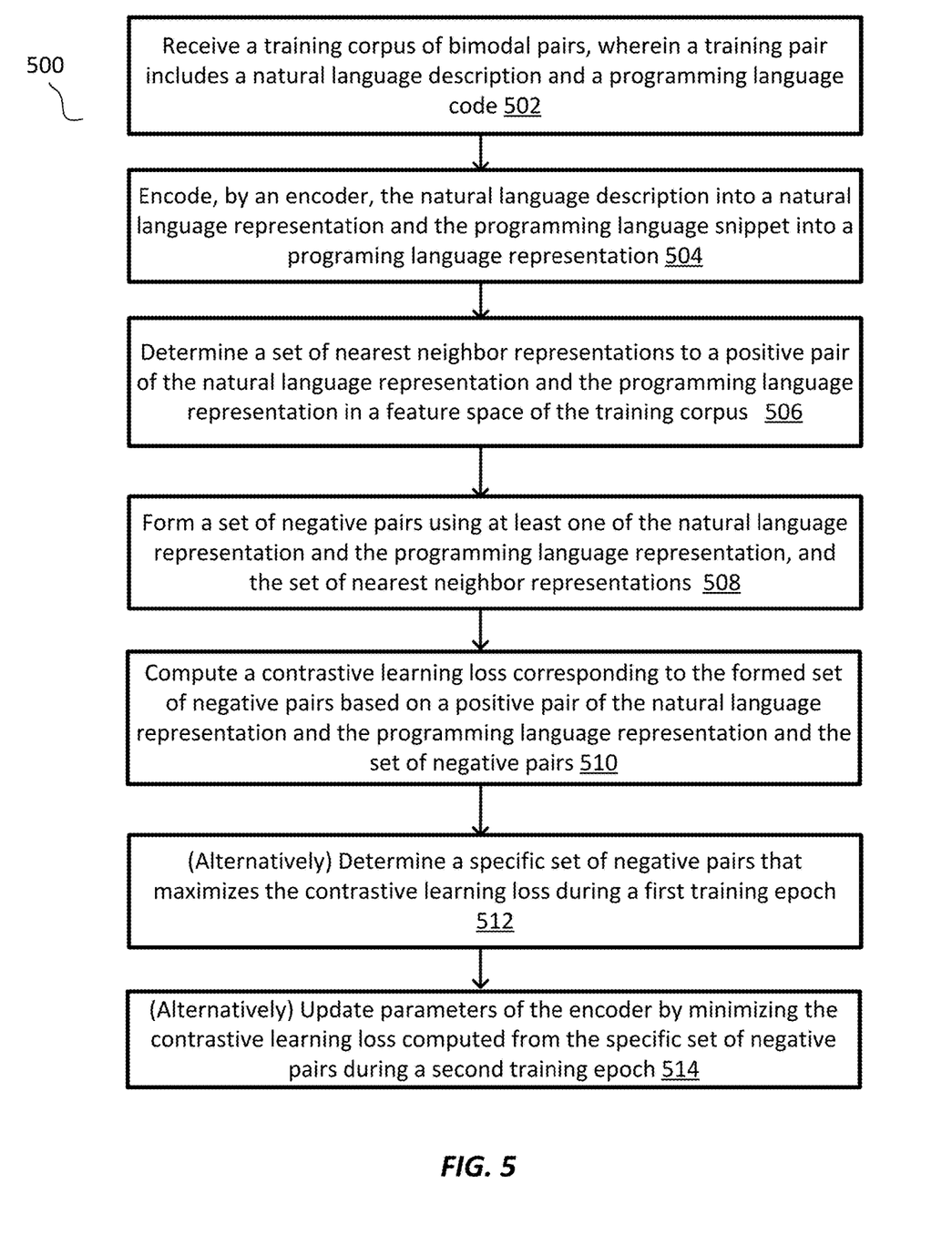
FIG. 5 is a simplified diagram of a method for contrastive learning for natural language and code representations for semantic code search, according to some embodiments.

FIG. 5 is a simplified diagram of a method 500 for contrastive learning for natural language and code representations for semantic code search, according to some embodiments. One or more of the processes 502-514 of method 500 may be implemented, at least in part, in the form of executable code stored on non-transitory, tangible, machine-readable media that when run by one or more processors may cause the one or more processors to perform one or more of the processes 502-514.

At step 502, a training corpus of bimodal pairs may be received, e.g., via the data interface 415 in FIG. 4. The training corpus includes at least one training pair of a natural language description (e.g., NL input 202) and a programming language snippet (e.g., PL input 203).

At step 504, an encoder may encode the natural language description (e.g., NL input 202) into a natural language representation (e.g., an NL embedding 204) and the programming language snippet (e.g., PL input 203) into a programing language representation (e.g., a PL embedding 205). For example, the encoder may be a Transformer encoder.

At step 506, a set of nearest neighbor representations (e.g., the hard negatives 214) to a positive pair (e.g., positive pair 206) of the natural language representation and the programming language representation may be determined in a feature space (e.g., space 220) of the training corpus. Different implementations of selecting the set of nearest neighbor representations may be presented in FIG. 6.

At step 508, a set of negative pairs are formed using at least one of the natural language representations (e.g., NL embedding 204) and the programming language representation (e.g., PL embedding 205), and the set of nearest neighbor representations (e.g., hard negatives 214).

At step 510, a contrastive learning loss based on a positive pair (e.g., positive pair 206) of the natural language representation and the programming language representation and the set of negative pairs. For example, the contrastive learning loss may be computed according to Eq. (2), which only includes the set of the top-K hardest negatives for each training pair of the NL input 202 and PL input 203. The encoder may be updated based on the contrastive learning loss via backpropagation.

In one embodiment, method 500 may be implemented as an adversarial learning algorithm, which alternately optimizes over the set of hard negatives and the model parameters θ. At step 512, a specific set of negative pairs that maximizes the contrastive learning loss during a first training epoch may be determined.

Alternately, at step 514, parameters of the encoder are updated by minimizing the contrastive learning loss computed from the specific set of negative pairs during a second training epoch. For example, let L(θ, H) denote the contrastive loss defined in Equation (2) depending on the parameters θ (the temperature σ as part of the parameters θ) and a specific set of hard negatives H, the hard negatives H can be considered as adversaries that aim at maximizing L, while θ is updated to minimize L:

$$\theta^* = \arg\min \mathcal{L}(\theta, H^*) \quad (3)$$

where $H^* = \arg\max \mathcal{L}(\theta, H)$.

In other words, H and θ are optimized alternatively for each epoch, by index update and model update. In this way, by training against the adversaries, the model needs to minimize the loss in difficult scenarios, therefore learning a more robust and discriminative model.

In some embodiments, method 500 may repeat multiple times until the semantic code search model is trained.

Figure 6:
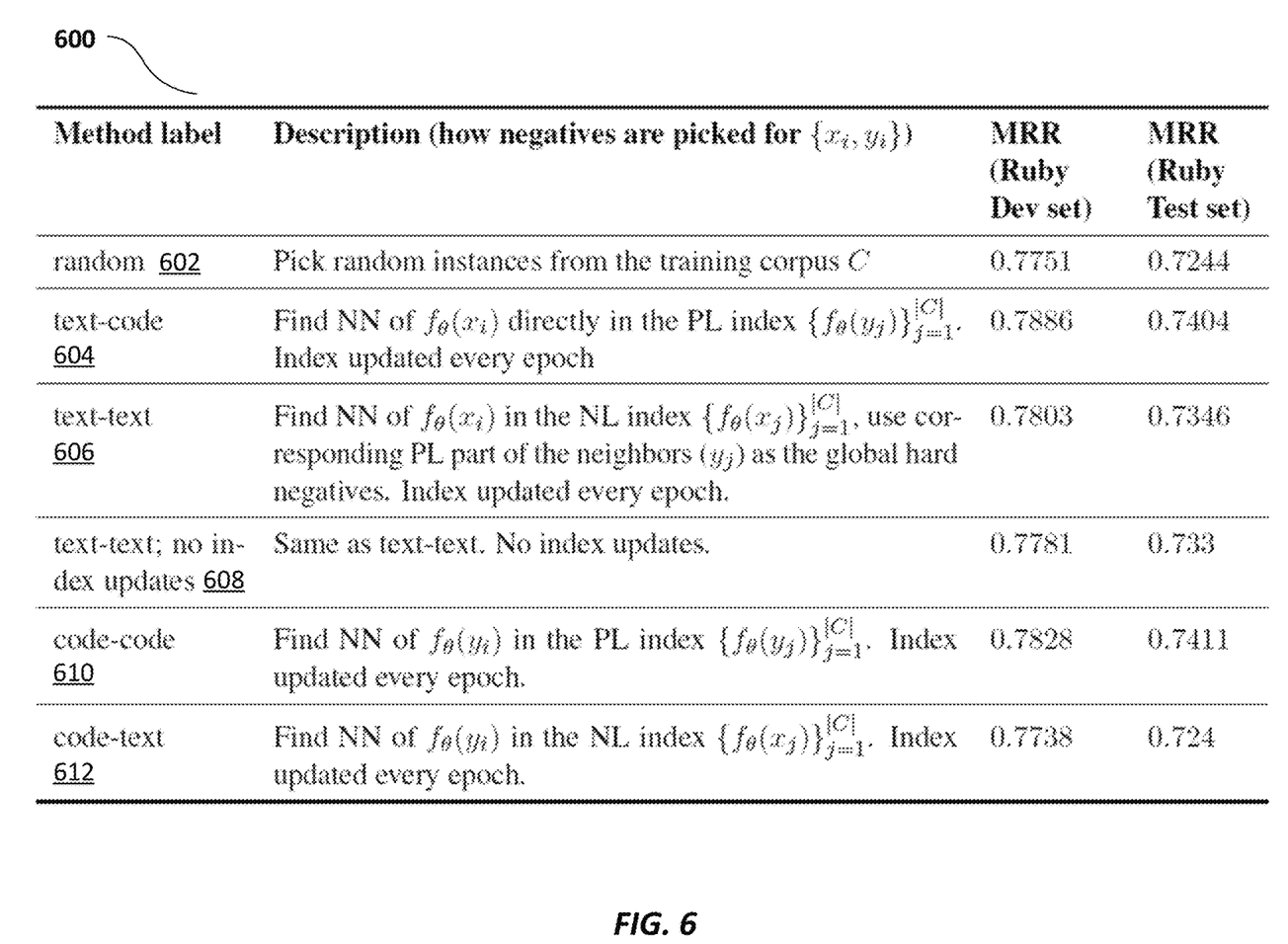
FIG. 6 provides a data table comparing different ways of designing hard negatives for a training instance, according to one embodiment described herein.

FIG. 6 provides a data table comparing different ways of designing hard negatives for a training instance $\{x_i, y_j\}$, according to one embodiment described herein. As show by table 600, a random method 602 may randomly select the set of nearest neighbor representations from representations of the training corpus of bimodal pairs in the feature space.

The text-code method 602 may select the set of nearest neighbor representations from a plurality of programming language representations $\{f\theta(y_j)\}_{j=1}^{|c|}$ that are generated from the training corpus, as having closest distances to the natural language representation $f_\theta(x_i)$ in the feature space, and each negative pair is formed by a selected programming language representation and the natural language representation $f_\theta(x_i)$.

The PL index $\{f_\theta(y_j)\}_{j=1}^{|c|}$ may be updated every epoch.

The text-text method 604 may select the set of nearest neighbor representations from a plurality of natural language representations $\{f_\theta(x_j)\}_{j=1}^{|c|}$ that are generated from the training corpus, as having closest distances to the natural language representation $f_\theta(x_i)$ in the feature space, and each negative pair is formed by a corresponding programing language representation of a selected natural language representation and the natural language representation $f_\theta(x_i)$.

The NL index $\{f_\theta(x_j)\}_{j=1}^{|c|}$ may be updated every epoch.

The text-text method 608 may be similar to method 606, but with no index update.

The code-code method 610 may select the set of nearest neighbor representations from a plurality of programming language representations $\{f_\theta(y_j)\}_{j=1}^{|c|}$ that are generated from the training corpus, as having closest distances to the programming language representation $f_\theta(y_i)$ in the feature space, and each negative pair is formed by a corresponding natural language representation of a selected programming language representation and the programming language representation $f_\theta(y_i)$. The PL index $\{f_\theta(y_j)\}_{j=1}^{|c|}$ may be updated every epoch.

The code-text method 612 may select the set of nearest neighbor representations from a plurality of natural language representations $\{f_\theta(x_j)\}_{j=1}^{|c|}$ that are generated from the training corpus, as having closest distances to the programming language representation $f_\theta(y_i)$ in the feature space, and each negative pair formed by a selected natural language representation and the programming language representation $f_\theta(y_i)$. The NL index $\{f_\theta(x_j)\}_{j=1}^{|c|}$ may be updated every epoch.

These variants listed in table 600 differ in the query embedding we use: $f_\theta(x_i)$ or $f_\theta(y_i)$, and in the choice of the index being probed: NL index $\{f_\theta(x_j)\}_{j=1}^{|c|}$ or the PL index $\{f_\theta(y_j)\}_{j=1}^{|c|}$. The negative examples returned for an input instance are dynamic as the query embedding $f_\theta(x_i)$ or $f_\theta(y_i)$ will change with the model parameters θ being updated over the training iterations.

Example Performance

For example, GraphCodeBERT may be trained using these variants in table 600 on the CodeSearchNet Ruby corpus and report the performance in Table 600. Performance gains are observed with all variants that leverage hard negatives over the choice of random negatives, highlighting that the quality along with the quantity of negative examples matter in contrastive representation learning. Given a batch B of bimodal instances $\{x_i, y_i\}$, K nearest neighbors are obtained for each training instance using one of the methods in Table 600. While the K neighbors can serve as hard negatives for a training instance, the B−1 in-batch negatives are utilized and the K×(B−1) neighbors returned for the fellow in-batch examples as candidate negatives. Thus, the number of negatives for each instance would be ((K+1)× B)−1. Out of these variants, the text-text method 606 is chosen for subsequent results as it only uses the NL index and NL query embeddings, which are faster to construct. This is because the sequence length of the NL part (docstring) is typically much smaller than that of the PL part (source code). Also, when starting from scratch, this variant can benefit from better encoders that have seen pre-training data in the NL domain.

Figure 7:
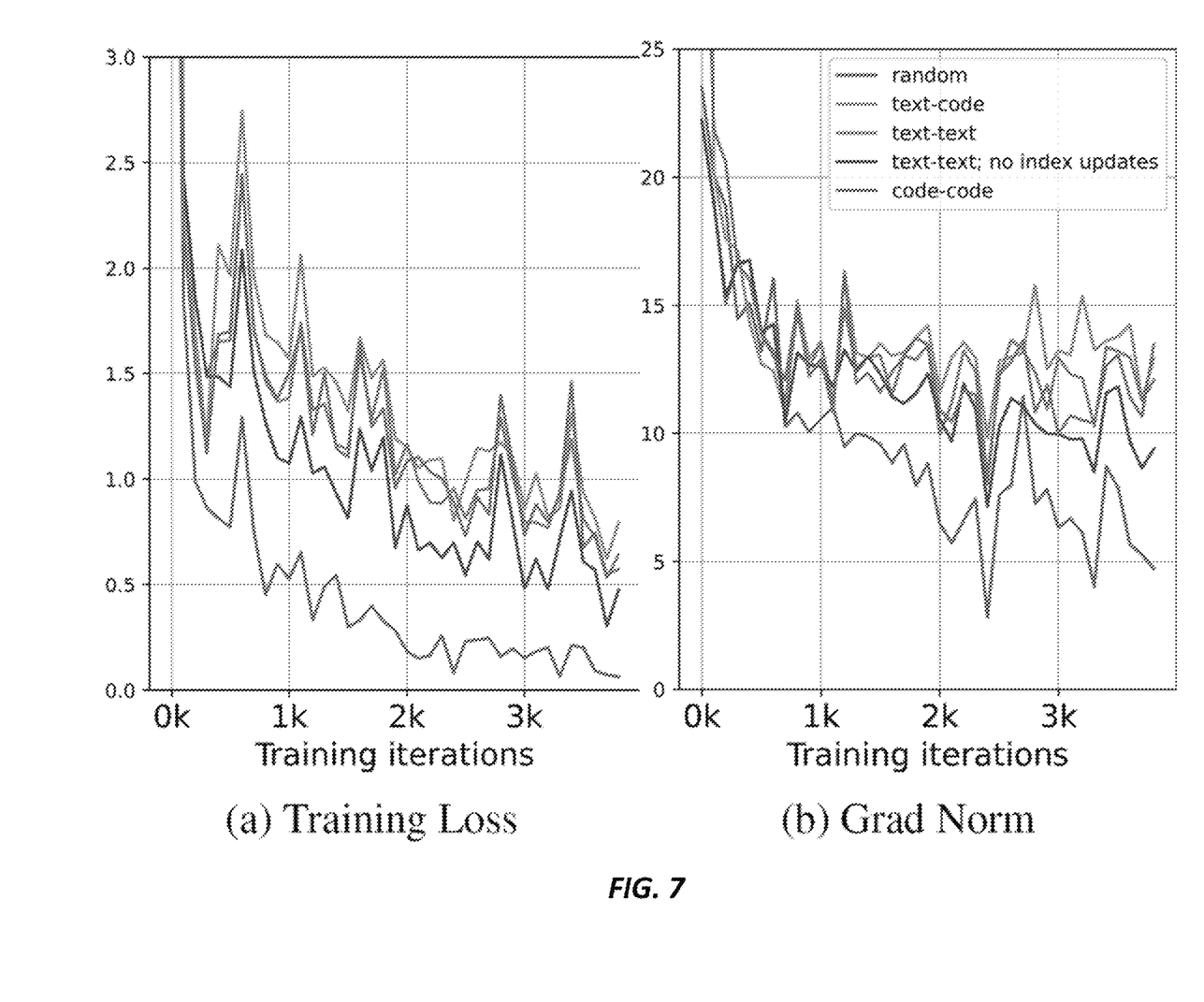
FIG. 7 provides a data table illustrating the loss and gradient norms of the method described herein, according to one embodiment described herein.

Table 600 also illustrates performance comparison between a variant of the text-text mining strategy with the FAISS index updates and without index updating. Table 600 shows the results with this strategy on the Ruby CodeSearchNet corpus. While performing no updates to the index does better than the naive approach of using random negatives, this scheme performs slightly worse than text-text, verifying the importance of updating the index. The loss and gradient norms for this particular variant is also shown in FIG. 7. For most iterations, the training loss corresponding to the variant without index updates is higher than that of the random variant, but lower than the variants with index updates. This suggests that while it is a more challenging and informative setup than random (which happens to be an easy task due to trivially unrelated negatives, and training loss close to 0), other variants with index updates provide a stronger training signal for learning a retrieval model. The gradient norms corresponding to this variant (text-text; no index updates) are higher than random, but lower than the variants with index updates, suggesting the effectiveness of updating the NL and/or PL index in improving the convergence of dense retrieval training.

The training loss and the gradient norms of different layers of the transformer encoder in the GraphCodeBERT model are recorded as shown in FIG. 7. The uninformative random negatives lead to lower loss and gradient norms, while global negatives maintain a higher gradient norm, which can reason the effectiveness of using hard negatives.

Figure 8:
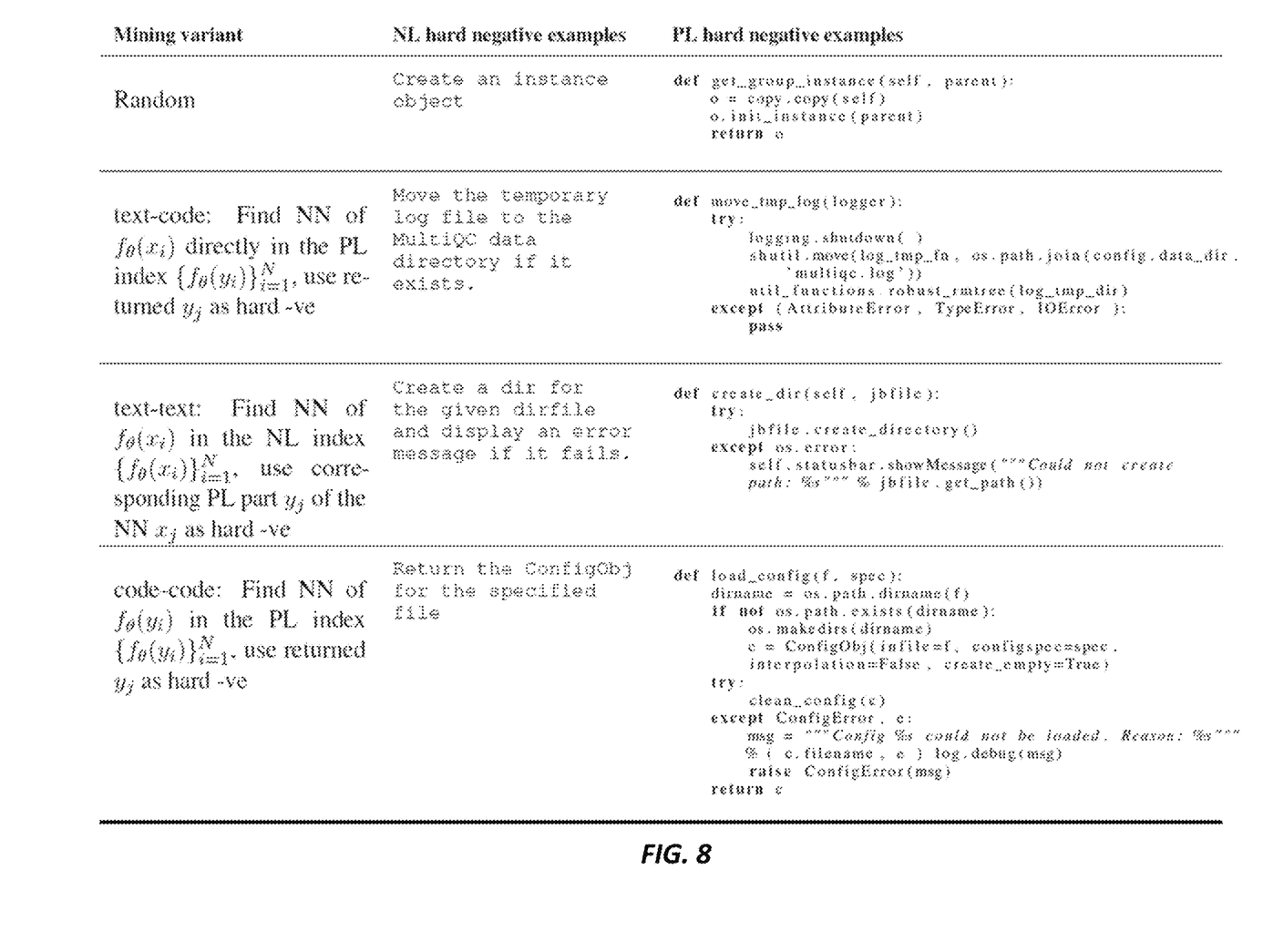
FIG. 8 provides example hard negatives generated using different variants shown in FIG. 6 for an example training instance, according to one embodiment described herein.

FIG. 8 provides example hard negatives generated using different variants shown in FIG. 6 for an example training instance, according to one embodiment described herein. In FIG. 8, an example of a training instance from the Python CodeSearchNet corpus and the hard negatives (top nearest neighbor) obtained from the corpus using different mining variants are presented. These are observed before the first training iteration, so the nearest neighbors are retrieved using the pre-trained GraphCodeBERT model embeddings that has seen no fine-tuning data. While the neighbor retrieved by text-text is semantically closest to the query, the outputs from text-code and code-code also share some structural similarities with the input (try and except blocks) as compared to the randomly picked code snippet which is fairly unrelated.

Additional data experiments are conducted with the CodeSearchNet corpus and on an adversarial test to show the robustness of the model. The CodeSearchNet code corpus is used to train the retrieval model. The dataset provides bimodal pairs (natural language docstring and corresponding code) in six programming languages—Python, Java, Go, Ruby, Php, Javascript. Low quality queries are filtered using hand-crafted rules and expanding the size of target set seen during inference from 1000 to the whole corpus to make the setup more realistic.

Figure 9:
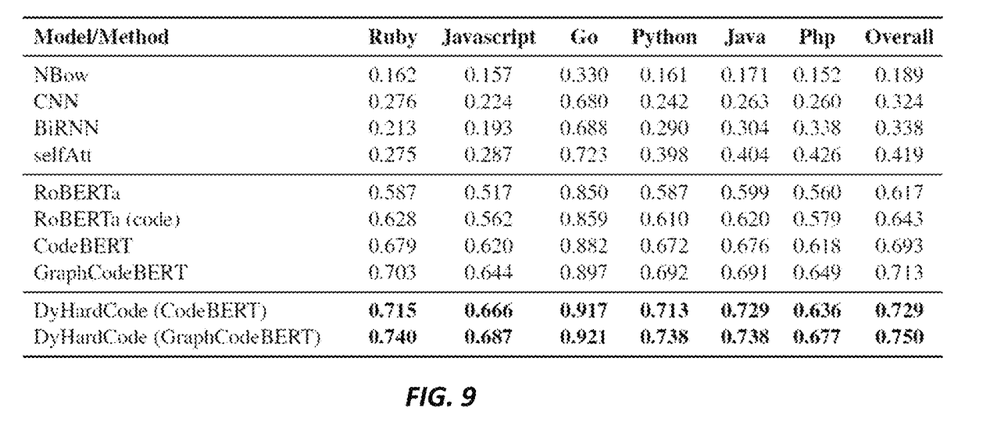
FIGS. 9-11 provide additional example performance comparison of the model described herein with baselines, according to one embodiment described herein.

With the Mean Reciprocal Rank (MRR) as the evaluation metric of codesearch task, the test results of previously proposed methods can be found in FIG. 9. GraphCodeBERT has been pre-trained on code by considering the inherent structure of code (i.e., the data flow graph), instead of simply treating a code snippet as a sequence of tokens. This led to improvements over CodeBERT baselines for the code search task and is currently the state-of-the-art on this task. The training (fine-tuning for code search) scheme for all the baselines (top 8 rows in FIG. 9) uses the objective described in Eq. (1) and the test set results are as reported in Guo et al. During inference, all models compute the inner product of the query embedding and the candidate code embeddings as relevance scores to rank the code snippets in the corpus of the respective programming language. Training (finetuning for code search) GraphCodeBERT model with the semantic code search module 130 described herein leads to results on all six languages and an overall relative gain of 4.3%, demonstrating the effectiveness of using hard negatives.

To evaluate the robustness of our proposed training scheme, evaluation on the CodeSearchNet AdvTest dataset from the CodeSearchNet corpus is conducted. The function and variable names appearing in the code snippets in the test and development sets of this Python dataset are normalized (func for function names, arg-i for the i-th variable name). This dataset was processed and released by Lu et al., Codexglue: A machine learning benchmark dataset for code understanding and generation, arXiv preprint arXiv: 2102.04664, 2021 to test the understanding and generalization abilities of the model as part of the CodeXGLUE benchmark. CodeBERT is trained using the proposed contrastive learning framework (denoted by "DyHardCode") described in FIG. 3 with K=10 neighbors for each instance in the batch.

Figure 10:
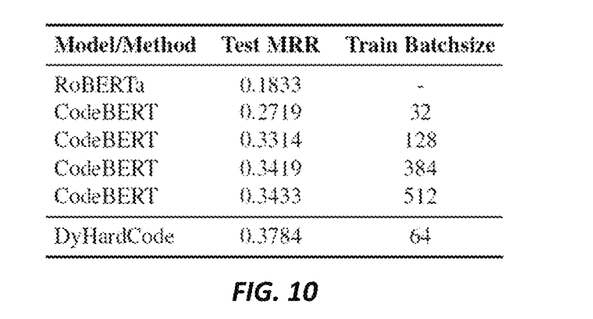

FIG. 10 shows the results on the adversarial test. It is observed that the retrieval performance of the baseline (second row) is substantially improved by increasing the training batch size and further achieve gains by leveraging hard negatives with the DyHardCode framework.

Figure 11:
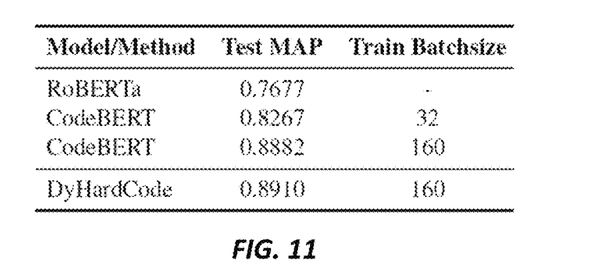

In one embodiment, embodiments of leveraging hard negatives in contrastive learning of representations for retrieval to the Code-Code search task may be extended. Here, the query $y_q$ and the set of candidates $C = \{y_{c_1}, \ldots, y_{c_{|C|}}\}$ are both in the PL domain. Here, the POJ-104 dataset (described in Mou et al., Convolutional neural networks over tree structures for programming language processing, In Proceedings of the AAAI Conference on Artificial Intelligence, volume 30, 2016) that consists of 104 programming problems each with 500 solutions in C/C++ is used. The evaluation metric used is Mean Average Precision (MAP) @ R=499. This represents what fraction of the true 499 semantically similar code snippets are returned in the top K=499 outputs (nearest neighbors) by the model. FIG. 11 shows the baseline results along with DyHardCode (code-code) applied with K=1, suggesting the effectiveness of hard negatives for code search in the unimodal (PL only) setup as well.

Some examples of computing devices, such as computing device 200 may include non-transitory, tangible, machine readable media that include executable code that when run by one or more processors (e.g., processor 110) may cause the one or more processors to perform the processes of method 400. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for a natural language code search system, the method comprising:
   receiving, via a communication interface, a training corpus of bimodal pairs, wherein at least one training pair from the training corpus includes a natural language description and a corresponding programming language snippet;
   encoding, at a beginning of a first training epoch for training a code search neural network model using the training corpus, by an encoder associated with a first set of model parameters of the code search neural network model implemented on one or more processors, the training corpus of natural language descriptions and programming language snippet into a set of representations in a feature space, wherein the natural language description is encoded into a natural language representation and the corresponding programming language snippet is encoded into a programming language representation, wherein the natural language representation and the programming language representation form a positive pair;
   determining, by the one or more processors, a set of nearest neighbor representations to at least one of the natural language representation or the programming language representation among the set of representations in the feature space of the training corpus;
   forming a set of negative pairs, including forming each negative pair in the set of negative pairs to include the natural language representation or the programming language representation, and one nearest neighbor representation in the set of nearest neighbor representations;
   training the code search neural network model including updating the first set of model parameters at an end of the first training epoch based at least in part on a contrastive learning loss comparing the positive pair and the set of negative pairs;
   dynamically re-encoding, at a next training epoch for training the code search neural network model using the training corpus, by the encoder associated with the updated first set of model parameters, the training corpus of natural language descriptions and programming language snippet into an updated set of representations in the feature space;
   training the code search neural network model at the next training epoch using the contrastive learning loss of the positive pair and the set of negative pairs selected based on the updated set of representations;
   receiving, by the communication interface, a natural language search query for a programming language snippet; and
   outputting, by the trained code search neural network model, the programming language snippet based on an input of the natural language search query.

2. The method of claim 1, wherein the set of nearest neighbor representations are selected from a plurality of programming language representations that are generated from the training corpus, as having closest distances to the natural language representation in the feature space, and
   wherein the set of negative pairs contains a negative pair formed by a selected programming language representation and the natural language representation.

3. The method of claim 1, wherein the set of nearest neighbor representations are selected from a plurality of natural language representations that are generated from the training corpus, as having closest distances to the natural language representation in the feature space, and
   wherein the set of negative pairs contains a negative pair formed by a corresponding programming language representation of a selected natural language representation and the natural language representation.

4. The method of claim 1, wherein the set of nearest neighbor representations are selected from a plurality of programming language representations that are generated from the training corpus, as having closest distances to the programming language representation in the feature space, and
   wherein the set of negative pairs contains a negative pair formed by a corresponding natural language representation of a selected programming language representation and the programming language representation.

5. The method of claim 1, wherein the set of nearest neighbor representations are selected from a plurality of natural language representations that are generated from the training corpus, as having closest distances to the programming language representation in the feature space, and
   wherein the set of negative pairs contains a negative pair formed by a selected natural language representation and the programming language representation.

6. The method of claim 1, wherein the encoder is a Transformer encoder.

7. The method of claim 1, wherein the natural language representation and the programming language representation are obtained by constructing a FAISS index of the at least one training pair at a beginning of training with initial model parameters for the encoder.

8. The method of claim 7, wherein the FAISS index is periodically re-constructed using updated model parameters for the encoder after a training epoch.

9. The method of claim 1, wherein the contrastive learning loss corresponds to the formed set of negative pairs, and the method further comprises:
- determining a specific set of negative pairs that maximizes the contrastive learning loss during the first training epoch; and
- updating parameters of the encoder by minimizing the contrastive learning loss computed from the specific set of negative pairs during the next training epoch.

10. A system for natural language code search, the system comprising:
- a communication interface receiving a training corpus of bimodal pairs and a natural language search query for a predicted programming language snippet, wherein at least one training pair from the training corpus includes a natural language description and a corresponding programming language snippet;
- a memory storing an encoder associated with a first set of model parameters of a code search neural network model and a plurality of processor-executable instructions; and
- a processor executing the instructions to perform operations comprising:
  - encoding, at a beginning of a first training epoch for training the code search neural network model using the training corpus, by the encoder, the training corpus of natural language descriptions and programming language snippet into a set of representations in a feature space, wherein the natural language description is encoded into a natural language representation and the corresponding programming language snippet is encoded into a programming language representation, wherein the natural language representation and the programming language representation form a positive pair;
  - determining, by the processor, a set of nearest neighbor representations to at least one of the natural language representation or the programming language representation among the set of representations in the feature space of the training corpus;
  - forming a set of negative pairs, including forming each negative pair in the set of negative pairs to include the natural language representation or the programming language representation, and one nearest neighbor representation in the set of nearest neighbor representations;
  - training the code search neural network model including updating the first set of model parameters at an end of the first training epoch based at least in part on a contrastive learning loss comparing the positive pair and the set of negative pairs;
  - dynamically re-encoding, at a next training epoch for training the code search neural network model using the training corpus, by the encoder associated with the updated first set of model parameters, the training corpus of natural language descriptions and programming language snippet into an updated set of representations in the feature space;
  - training the code search neural network model at the next training epoch using the contrastive learning loss of the positive pair and the set of negative pairs selected based on the updated set of representations; and
  - outputting, by the trained code search neural network model, the predicted programming language snippet based on an input of the natural language search query.

11. The system of claim 10, wherein the set of nearest neighbor representations are selected from a plurality of programming language representations that are generated from the training corpus, as having closest distances to the natural language representation in the feature space, and
wherein the set of negative pairs contains a negative pair formed by a selected programming language representation and the natural language representation.

12. The system of claim 10, wherein the set of nearest neighbor representations are selected from a plurality of natural language representations that are generated from the training corpus, as having closest distances to the natural language representation in the feature space, and
wherein the set of negative pairs contains a negative pair formed by a corresponding programming language representation of a selected natural language representation and the natural language representation.

13. The system of claim 10, wherein the set of nearest neighbor representations are selected from a plurality of programming language representations that are generated from the training corpus, as having closest distances to the programming language representation in the feature space, and
wherein the set of negative pairs contains a negative pair formed by a corresponding natural language representation of a selected programming language representation and the programming language representation.

14. The system of claim 10, wherein the set of nearest neighbor representations are selected from a plurality of natural language representations that are generated from the training corpus, as having closest distances to the programming language representation in the feature space, and
wherein the set of negative pairs contains a negative pair formed by a selected natural language representation and the programming language representation.

15. The system of claim 10, wherein the natural language representation and the programming language representation are obtained by constructing a FAISS index of the at least one training pair at a beginning of training with initial model parameters for the encoder.

16. The system of claim 15, wherein the FAISS index is periodically re-constructed using updated model parameters for the encoder after a training epoch.

17. The system of claim 10, wherein the contrastive learning loss corresponds to the formed set of negative pairs, and the processor executing the instructions to perform operations comprising:
- determining a specific set of negative pairs that maximizes the contrastive learning loss during the first training epoch; and
- updating parameters of the encoder by minimizing the contrastive learning loss computed from the specific set of negative pairs during the next training epoch.

18. A non-transitory processor-readable storage medium storing a plurality of processor-executable instructions for natural language code search, the instructions being executed by a processor to perform operations comprising:
- receiving, via a communication interface, a training corpus of bimodal pairs, wherein at least one training pair from the training corpus includes a natural language description and a corresponding programming language snippet;

encoding, at a beginning of a first training epoch for training a code search neural network model using the training corpus, by an encoder associated with a first set of model parameters of the code search neural network model implemented on one or more processors, the training corpus of natural language descriptions and programming language snippet into a set of representations in a feature space, wherein the natural language description is encoded into a natural language representation and the corresponding programming language snippet is encoded into a programming language representation, wherein the natural language representation and the programming language representation form a positive pair;

determining, by the one or more processors, a set of nearest neighbor representations to at least one of the natural language representation or the programming language representation among the set of representations in the feature space of the training corpus;

forming a set of negative pairs, wherein at least one including forming each negative pair in the set of negative pairs to include includes the natural language representation or the programming language representation, and one nearest neighbor representation in the set of nearest neighbor representations;

training the code search neural network model including updating the first set of model parameters at an end of the first training epoch based at least in part on a contrastive learning loss comparing the positive pair and the set of negative pairs;

dynamically re-encoding, at a next training epoch for training the code search neural network model using the training corpus, by the encoder associated with the updated first set of model parameters, the training corpus of natural language descriptions and programming language snippet into an updated set of representations in the feature space;

training the code search neural network model at the next training epoch using the contrastive learning loss of the positive pair and the set of negative pairs selected based on the updated set of representations;

receiving, by the communication interface, a natural language search query for a predicted programming language snippet; and outputting, by the trained code search neural network model, the predicted programming language snippet based on an input of the natural language search query.

19. The non-transitory processor-readable storage medium of claim 18, wherein the set of nearest neighbor representations are selected from a plurality of programming language representations that are generated from the training corpus, as having closest distances to the natural language representation in the feature space, and wherein the set of negative pairs contains a negative pair formed by a selected programming language representation and the natural language representation.

20. The non-transitory processor-readable storage medium of claim 18, wherein the set of nearest neighbor representations are selected from a plurality of natural language representations that are generated from the training corpus, as having closest distances to the natural language representation in the feature space, and wherein the set of negative pairs contains a negative pair formed by a corresponding programming language representation of a selected natural language representation and the natural language representation.

* * * * *

UNITED STATES PATENT AND TRADEMARK OFFICE
CERTIFICATE OF CORRECTION

| | | |
|---|---|---|
| PATENT NO. | : 12,450,428 B2 | Page 1 of 1 |
| APPLICATION NO. | : 17/531591 | |
| DATED | : October 21, 2025 | |
| INVENTOR(S) | : Akhilesh Deepak Gotmare et al. | |

It is certified that error appears in the above-identified patent and that said Letters Patent is hereby corrected as shown below:

On the Title Page

Item [71], change:
"Salesforce.com, Inc."
To:
--Salesforce, Inc.--

In the Claims

Claim 18, Column 15, Lines 20-25, change:
"forming a set of negative pairs, wherein at least one including forming each negative pair in the set of negative pairs to include includes the natural language representation or the programming language representation, and one nearest neighbor representation in the set of nearest neighbor representations;"
To:
--forming a set of negative pairs, including forming each negative pair in the set of negative pairs to include the natural language representation or the programming language representation, and one nearest neighbor representation in the set of nearest neighbor representations;--

Signed and Sealed this
Second Day of December, 2025

John A. Squires
*Director of the United States Patent and Trademark Office*